(12) United States Patent
Webb

(10) Patent No.: US 6,842,786 B1
(45) Date of Patent: Jan. 11, 2005

(54) METHOD AND APPARATUS FOR REMOTE COMMUNICATION OF DATA ASSOCIATED WITH DYNAMICALLY GENERATED TYPE OBJECT AT RUNTIME TO DESCRIBE THE DATA TYPE

(75) Inventor: Brandyn Webb, Oceanside, CA (US)

(73) Assignee: Adobe Systems Incorporated, San Jose, CA (US)

( * ) Notice: Subject to any disclaimer, the term of this patent is extended or adjusted under 35 U.S.C. 154(b) by 603 days.

(21) Appl. No.: 09/781,007

(22) Filed: Feb. 9, 2001

(51) Int. Cl.[7] .............................................. G06F 15/16
(52) U.S. Cl. ....................... 709/230; 709/201; 709/203; 709/217; 709/219; 709/227; 719/328; 719/330
(58) Field of Search ................................. 709/201, 203, 709/217, 219, 227, 230, 310; 719/328, 330

(56) References Cited

U.S. PATENT DOCUMENTS

| | | | | |
|---|---|---|---|---|
| 5,504,901 A | * | 4/1996 | Peterson ..................... | 717/144 |
| 5,590,327 A | * | 12/1996 | Biliris et al. ................ | 709/100 |
| 5,592,588 A | * | 1/1997 | Reekes et al. .............. | 704/278 |
| 5,724,588 A | * | 3/1998 | Hill et al. ................... | 719/328 |
| 5,787,251 A | * | 7/1998 | Hamilton et al. ........... | 709/203 |
| 5,838,971 A | * | 11/1998 | Stadler et al. .............. | 709/328 |
| 6,035,303 A | | 3/2000 | Baer et al. | |
| 6,108,715 A | * | 8/2000 | Leach et al. ................ | 709/330 |
| 6,226,692 B1 | | 5/2001 | Miloushev et al. | |
| 6,263,379 B1 | * | 7/2001 | Atkinson et al. ........... | 709/332 |
| 6,336,148 B1 | * | 1/2002 | Doong et al. ............... | 709/316 |
| 6,381,735 B1 | * | 4/2002 | Hunt .......................... | 717/158 |
| 6,412,010 B1 | * | 6/2002 | Kind .......................... | 709/230 |
| 6,446,070 B1 | * | 9/2002 | Arnold et al. ............... | 707/10 |
| 6,487,607 B1 | * | 11/2002 | Wollrath et al. ............ | 719/330 |
| 6,629,153 B1 | * | 9/2003 | Gupta et al. ................ | 709/316 |
| 6,754,885 B1 | * | 6/2004 | Dardinski et al. .......... | 717/113 |

OTHER PUBLICATIONS

Markus Horstmann and Mary Kirtland, "DCOM Architecture," http://msdn.microsoft.com/library/en–us/dndcom/html/msdn dcomarch.asp?frame=true, pp. 1–42, Jul. 23, 1997.

Sun Microsystems, Inc., "Java™ Object Serialization Specification". Beta draft. Revision 1.4.3, Java™ 2SDK, Standard Edition, v1.3 Beta, pp. 1–72, Sep. 30, 1998.

Nathaniel G. Pryce, "Componenet Interaction in Distributed Systems", a Thesis for the degree of Doctor of Philosophy in the Faculty of Engineering of the University of London, and for the Dipoloma of the Imperial College of Science, Technology and Medicine, pp. 1–176, Jan. 2000.

* cited by examiner

Primary Examiner—Nabil El-Hady
(74) Attorney, Agent, or Firm—Fish & Richardson P.C.

(57) ABSTRACT

Methods and apparatus, including computer program apparatus, implement techniques for processing data. A first process runs in a first address space, and includes a request to send data having a data type to a second process running in a second address space. At runtime, a type creation function is called to create a first type object describing the data type. The first type object has a set of associated functions for processing data having the data type. The set of associated functions includes a marshalling function for encoding data having the data type and an unmarshalling function for decoding data having the data type. The data is sent to the second process by executing the marshalling function on the data in the first process to generate encoded data and executing the unmarshalling function on the encoded data to decode the encoded data in the second process.

28 Claims, 2 Drawing Sheets

US 6,842,786 B1

METHOD AND APPARATUS FOR REMOTE COMMUNICATION OF DATA ASSOCIATED WITH DYNAMICALLY GENERATED TYPE OBJECT AT RUNTIME TO DESCRIBE THE DATA TYPE

TECHNICAL FIELD

This invention relates to method, apparatus and computer program products for communicating data between computer-implemented processes.

BACKGROUND

A client process is a process capable of requesting and using a service, and a server process is a process capable of receiving a request for a service and providing that service. A client process requests the services of a server process by, for example, making a function call and passing one or more input parameters to the server process. After performing the requested service, the server process may pass back to the client process one or more output parameters (and/or a return value) reflecting the results of the requested service.

In this specification, the region of computer memory to which a process has access will be called that process's address space. If the client process and server process share a common address space (e.g., if the server process is an in-process server running within the same process as the client process, or if the server process is a local server process running on the same computer system as the client process), they can communicate simply by reading and writing into this common memory. If, on the other hand, the client process and server process do not share a common address space, such as where the server process is a remote server process running on a different computer system than the client process, the processes must communicate by some less direct means.

In order for a client process to request a service from a remote server process that does not share the same address space as the client process, the input parameters required by the server process must be packaged (or "encoded") in a form that is independent of the address space (i.e., does not rely on portions of encoded parameter data residing in particular locations of memory), and that is both sequential and compact, a process known as "marshalling". The encoded parameters are communicated to the server process as a packet or a stream, and then decoded at the server process in what essentially amounts to a reversal of the encoding process (called "unmarshalling") to recreate the input parameters in a form that is available to the server process (i.e., in a form that is dependent on the server process's address space).

SUMMARY

In general, in one aspect, the invention provides methods and apparatus, including computer program apparatus, implementing techniques for processing data. A first process runs in a first address space, and includes a request to send data having a data type to a second process running in a second address space. At runtime, a type creation function is called to create a first type object describing the data type. The first type object has a set of associated functions for processing data having the data type. The set of associated functions includes a marshalling function for encoding data having the data type and an unmarshalling function for decoding data having the data type. The data is sent to the second process by executing the marshalling function on the data in the first process to generate encoded data and executing the unmarshalling function on the encoded data to decode the encoded data in the second process.

Particular implementations of the invention can include one or more of the following advantageous features. The set of associated functions for processing data having the data type can include a print function for printing data having the data type. The data type can be an array type, an integer type, a pointer type, a real type, a string type or a structure type. The first type object can be a parameterized type object including an element identifying a location in memory and describing a format for the data type based on one or more type parameters in the identified location. The location in memory can be described by an offset element identifying a location relative to the data. The parameterized type object can describe a dynamically sized array, in which case the type parameters can include data specifying a size of the dynamically sized array. The parameterized type object can describe a dynamically typed pointer, in which case the type parameters can include data identifying a second type object.

The set of associated functions can include a type description function operable to generate a type object description describing the first type object. The encoded data can include an encoded representation of the type object description. Executing the unmarshalling function to decode the encoded data can include reconstructing the data in the second address space based on the type object description. The first type object can have a set of properties including a limitation condition specifying a limitation on permissible values for data having the data type. Executing the unmarshalling function to decode the encoded data can include returning an error message if the data violates the limitation condition. The type creation function can be called in the first process to create a first instance of the first type object and in the second process to create a second instance of the first type object. The data can be encoded from data having a first format in the first process and decoded into data having a second, different format in the second process. The encoded data can be generated in a format that is independent of data format of the decoded data in the first and/or second processes.

In general, in another aspect, the invention provides methods and apparatus, including computer program apparatus, implementing techniques for processing data. A first process in a first format runs in a first address space, and includes a request to send data having a data type to a second process in a second format running in a second address space. At runtime, a type creation function is called to create in the first process a first instance of a type object describing the data type. The type object has a set of associated functions for processing data having the data type. The type creation function is also called at runtime in the second process to create a second instance of the type object in the second process. The set of associated functions includes a marshalling function for encoding data having the data type and an unmarshalling function for decoding data having the data type. The data is sent to the second process by executing in the first process the marshalling function of the first instance of the type object to generate encoded data in a format independent of the first and second formats, communicating the encoded data from the first process to the second process, and executing in the second process the unmarshalling function of the second instance of the type object to decode the encoded data in the second process.

The details of one or more embodiments of the invention are set forth in the accompanying drawings and the descrip-

DESCRIPTION OF DRAWINGS

Like reference symbols in the various drawings indicate like elements.

DETAILED DESCRIPTION

Figure 1:
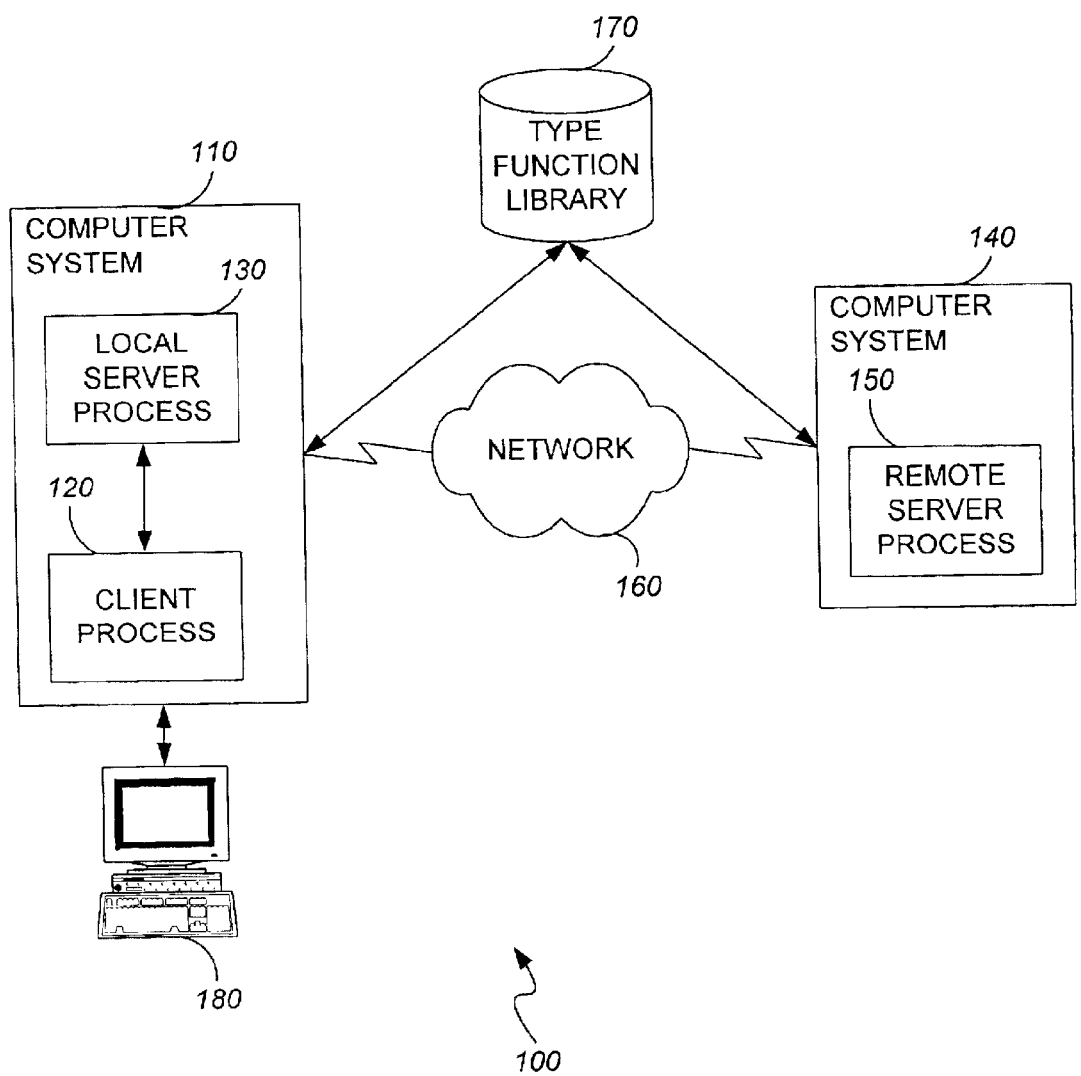
FIG. 1 is a block diagram illustrating a data processing system according to the invention.

FIG. 1 illustrates a system 100 that includes a general-purpose programmable digital computer system 110 of conventional construction, including a memory and a processor for running a client process 120 and a local server process 130, and input/output devices 180. Computer system 110 also includes conventional communications hardware and software by which computer system 110 can be connected to other computer systems, including a remote computer system 140 including a memory and a processor running a remote server process 150, by a computer network 160, such as a local area network, wide area network or the internet. Memory 170 stores a library of functions that for describing data and communicating that data between processes. Although FIG. 1 illustrates each computer system as a single computer, the functions of each system can be distributed on a network.

Client process 120 and server processes 130 and 150 are computer-implemented processes, such as a software application program written in an object-oriented language such as C++. Sever processes 130 and 150 are written to make use of one or more input parameters, which may take the form of data values having one or more types, such as an integer, real number, string, pointer or other conventional data structure. Before requesting the services of server processes 130 or 150, client process 120 generates the required data values, and passes the values as input parameters to the desired server process.

Figure 2:
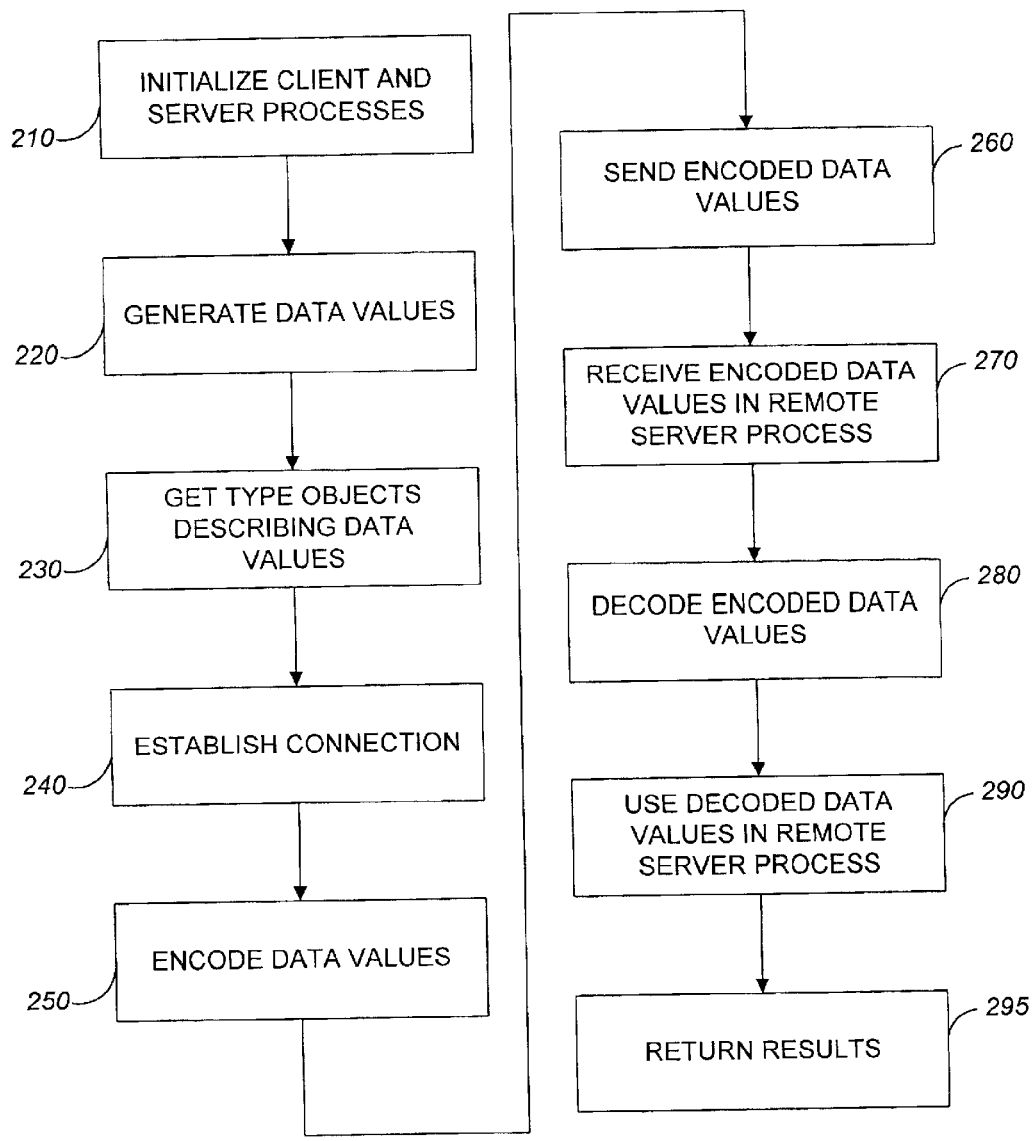
FIG. 2 is a flow diagram illustrating a method by which a client process requests a service from a remote server process according to the invention.

FIG. 2 illustrates a method 200 for client process 120 to request a service tom remote server process 150. The method begins when client process 120 and remote server process 150 are initialized (step 210)—for example, when a user launches a software application program or programs implementing the respective processes. Client process 120 generates one or more data values, which may be, e.g., input parameter values (e.g., particular integer, real number, string, array, pointer or other structure) required by remote server process 150 (step 220), and stores the data values in the address space of client process 120—for example, adding the data values to a memory stack in client process 120's address space. At runtime, system 100 calls a type description function in library 170 to obtain a type object describing the data type of the data values (step 230). As used in this specification, "runtime" is used in its conventional sense to refer to any of the time during which a program is executing and is not limited, for example, to time immediately before client process 120 requests the service from remote server process 150. Thus, as used herein calling the type description function at runtime includes, for example and without limitation, calling the function upon initialization of client process 120 or remote server process 150, or during execution of client process 120, either before or after generation of the required data values. Either client process 120 or remote server process 150, or both, may call the type description function in library 170. If the processes are physically remote from each other, they can use distinct copies of the library 170. In one implementation, both client process 120 and remote sever process 150 call the type description function in library 170, creating two instances of the type object—one on the client side and one on the server side—which will be invoked by the respective processes, and which can be identified by a common registration ID agreed upon by the two processes. Alternatively, the process that calls the type description function in step 230 can send the resulting type object or objects to the other process at some time before the data is to be sent or with the data. Optionally, system 100 verifies that client process 120 agree on a common type description for the data type—for example, by causing client process 120 to send a "checksum" of the type object, generating an error message if the two objects do not agree.

To request the service from remote server process 150, client process 120 establishes a connection to remote server process 150 (step 240). Client process 120 marshals the data values for communication to remote server process 150 by reading the data values from memory in the address space of client process 120 and calling a TypeEncode function from library 170 for the type described by each type object obtained in step 230 to encode the data values (step 250). Client process 120 adds the encoded data values to a data package or stream and sends the package or stream over the connection established in step 240 (step 260). The encoded data values are received in remote server process 150 (step 270), which decodes the encoded data values by calling a TypeDecode function from library 170 for each of the encoded types and stores the decoded data values in the address space of remote server process 150 (step 280)—for example, by recreating the stack from client process 120's address space in the address space of remote server process 150. Remote server process 150 uses the decoded data values as input parameters to perform the requested service (step 290). Optionally, performance of the requested service by remote server process 150 may generate one or more output parameter values or a return value, which may be communicated back to client process 120 using similar techniques (step 295).

As described above, in one implementation a process running in system 100 can call a type description function in library 170, which returns a 1cType, which is a type object (which may take the form of, e.g., a pointer to a C structure) describing a data type. The contents of a 1cType object describe the format of some particular data type. Thus, for example, in one implementation library 170 can include a function 1cTypeIntGet, which returns a 1cType object that describes an integer (any integer) in system 100. Similarly, library 170 can include a function 1cTypeRealGet, which returns a 1cType object that describes a real number in system 100.

Likewise, library 170 can include functions that return 1cType objects describing more complex data types, such as strings, arrays, pointers and structures. A 1cTypeCStringCreate function, for example, takes an integer representing a maximum string length (maxLength) as an input parameter and returns a 1cType object describing a cstring having the specified maximum length. When a data value of this type is to be encoded or decoded in system 100, the maxLength parameter determines the number of bytes required to encode the string's length and also places a limit on the size of string the decode method will attempt to allocate and fill. During encoding or decoding, any string longer than maxLength (or any array, structure or other data value that exceeds predetermined size limits for its defined type, as discussed below) will cause an error that will abort the entire encode/decode hierarchy. Client process 120 can be configured to refuse to encode any string (or other data) that exceeds its predetermined size limit. Similarly, remote server process 150 can reject such data and identify a process sending such data as faulty or malicious and initiate appropriate action by a user or by system 100.

A 1cTypeArrayCreate function in library 170 returns a parameterized 1cType object describing an array based on input parameters including a 1cType object parameter that specifies the type of each element of the array, a numElements parameter specifying the number of elements, a maxAllowed parameter specifying the maximum number of elements allowed in the array, and a sizeOffset parameter specifying an offset to an integer specifying an effective number of elements in the array. In one implementation, if the numElements parameter is non-zero, the array is fixed at the specified length (a pointer to an array of this type points to the zeroth element of an allocated array), while if numElements is zero the array is dynamically allocated (such that a pointer to an array of this type points to a pointer to the zeroth element of an allocated array).

The size of the array may be dynamically allocated as well. A sizeOffset parameter of zero indicates that the array is of fixed size, while a non-zero sizeOffset specifies an offset from the pointer pointing to the array to an integer specifying the current effective number of elements in the array. Typically, sizeOffset is a negative integer because remote process 150 must decode the sizeOffset before decoding the array itself, however, sizeOffset may be positive if, for example, the array is included in a struct that is to be decoded in non-sequential order. SizeOffset may be calculated using a FieldsOffset function in library 170, which returns an integer indicating the offset between two named fields in a structure (such as a typical C struct), taking as input parameters the type of structure, a fromField specifying the name of the field from which the offset is to be calculated, and a toField specifying the name of the field to which the offset is to be calculated. If toField occurs before fromField in the structure, the return value is negative, which may be useful as in the following example:

```
struct fooStruct {
    int size;
    cstring sized[10] ;
};
...
fooStructType = lcTypeStructCreate ("fooStruct",
sizeof (struct fooStruct),
    "size", lcTypeIntGet( ), lcFieldOffset(fooStruct, size),
    "sized", lcTypeArrayCreate(lcTypeCStringCreate(200), 10,
lcFieldsOffset(fooStruct, sized, size), 10),
lcFieldOffset(fooStruct, sized),
struct fooStruct {
    int size;
    cstring *dynamic;
    cstring fixed[10];
    cstring sized[10];
};
...
fooStructType = lcTypeStructCreate("fooStruct",
sizeof(struct fooStruct),
    "size", lcTypeIntGet( ), lcFieldOffset(fooStruct, size),
    "dynamic", lcTypeArrayCreate(lcTypeCStringCreate(200), 0,
lcFieldsOffset(fooStruct, dynamic, size), 10),
lcFieldOffset(fooStruct, dynamic),
```

-continued

```
    "fixed", lcTypeArrayCreate(lcTypeCStringCreate(200), 10,
0, 10), lcFieldOffset(fooStruct, fixed),
    "sized", lcTypeArrayCreate(lcTypeCStringCreate(200), 10,
lcFieldsOffset(fooStruct, sized, size), 10), lcFieldOffset(fooStruct,
sized),
        NULL);
```

A 1cTypePointerCreate function in library 170 returns a parameterized 1cType object describing a pointer, based on input parameters including a 1cType object parameter describing the type of data to which the pointer will point and a typeOffset parameter specifying an offset to a type parameter—e.g., an integer identifying the registered type number of the type of the object pointed to by the pointer. If the 1cType parameter is non-null (and if typeOffset is zero), the pointer points to the known and specified type described by the type object. If 1cType is null and typeOffset is non-zero, the pointer is to a dynamically determined type from the set of known registered types. The following examples demonstrate calls to the 1cTypePointerCreate function:

```
extern lcType someType;
struct gooStruct {
    int type;
    someOb *staticPointer;
    lcValue dynamicPointer;
};
type = lcTypeStructCreate("gooStruct", sizeof(struct
gooStruct),
        "type", lcTypeIntGet( ), lcFieldOffset(gooStruct, type),
        "staticPointer", lcTypePointerCreate(someType, 0),
lcFieldOffset(gooStruct, staticPointer),
            "dynamicPointer", lcTypePointerCreate (NULL,
lcFieldsOffset (gooStruct, dynamicPointer, type)),
lcFieldOffset(gooStruct, dynamicPointer),
            NULL);
```

If 1cType is non-null and typeOffset is non-zero (or if 1cType is null and typeOffset is zero), the function will fail and return null.

A 1cTypeStructCreate function in library 170 returns a 1cType object describing structure such as a C struct. Input parameters include a string specifying the name to assign to the type, an integer specifying the size of the structure, a string specifying the name of the first field in the structure, a 1cType object describing the type of the first field, an integer specifying an offset of the first field (as described above in the context of 1cTypeArrayCreate), a string specifying the name of the second field, a 1cType object describing the type of the second field, an integer specifying an offset of the second field, and so on to the name, type and offset for the final field. Function calls to 1cTypeStructureCreate are shown above and in the following example:

```
struct vecStruct {
    int x,y,z;
};
...
vecType = lcTypeStructCreate("vecStruct", sizeof(struct vecStruct),
        "x,", lcTypeIntGet( ), lcFieldOffset(vecStruct, x),
        "y", lcTypeIntGet( ), lcFieldOffset(vecStruct, y),
        "z", lcTypeIntGet( ), lcFieldOffset(vecStruct, z),
```

In addition to type description functions, library 170 can include one or more generic functions for processing data values having types described by registered type objects. These functions can include, for example, functions retrieving a name or ID assigned to a specified 1cType, or retrieving the 1cType corresponding to a particular ID. Library 170 can also include functions to allocate or free memory used for an instance of a specified 1cType, and to initialize or empty a specified 1cType object, and to print a data value or values described by a 1cType object to a file, string, buffer or other output using a default or user-supplied print format. Other functions in library 170 can include functions for establishing and severing communications connections to specified addresses, functions specifying a method (a "receiver") to be called in remote server process 150 when an incoming message is received by a connection, and functions for encoding, sending and decoding data values described by 1cType objects.

A 1cTypeEncode function encodes, serializes or flattens a specified data value or values into a platform-independent data package or stream. The function takes as input parameters an 1cType object describing the data values to be encoded, a pointer pointing to the particular data values, a pointer to the target byte stream or buffer into which the encoded data is to be serialized and an integer identifying the space in bytes available in the target stream or buffer, and returns an integer reflecting the number of bytes written.

Client process 120 can send encoded data values by calling a 1cSend function in library 170, which encodes a specified data value having a registered 1cType (e.g., by internally calling the 1cTypeEncode function described above) and sends the encoded data value over a specified connection. The connection, a pointer identifying the data value, and a valid registered 1cType ID of the 1cType object describing the data value's type are required input parameters. This function passes the message (i.e., the encoded data value) to a receiver method defined for remote server process 150. The receiver method then processes the message—for example by dispatching a function call in server process 150 based on the type of message. Alternatively, remote server process 150 can be configured with multiple receiver methods—for example, a receiver message for each message type—for receiving and processing message of different types.

Remote server process 150 decodes encoded parameter values using a 1cTypeDecode function in library 170. This function takes as input parameters a 1cType object describing the data values to be decoded, a pointer pointing to the (pre-allocated) memory space into which the data values will be decoded, a pointer to the target stream or buffer, and an integer specifying the size of the stream or buffer.

In one implementation, the decoding process in remote server process 150 is hidden from the typical application programmer. In this implementation, for each item of data to be encoded, the 1cSend function generates a data structure including an integer identifying the registered 1cType describing the data and a pointer pointing to the specific item of data. The 1cSend function calls the 1cTypeEncode function on that internal data structure, which function also encodes the data item as part of the recursive descent down the data structure. At the receiving end in this implementation, remote server process 150 is configured to receive only objects in the form of this internal structure (i.e., a structure containing an integer identifying a registered type and a pointer to an object of that type). Accordingly, remote server process 150 uses an 1cType object describing that type to decode every incoming data stream. In the course of decoding this object, remote server process 150 allocates and fills the space for the encoded data item. Thus, calls to the 1cTypeEncode function and the 1cTypeDecode function can be made explicitly, or from within the implementation of the 1cSend and Receive functions.

In one implementation, a 1cType to be encoded and sent from client process 120 to remote server process 150 must be registered with the same type ID in both client process 120 and remote server process 150 (e.g., client process 120 and remote server process 150 share the set of type objects describing data values generated in client process 120 and/or required by remote server process 150 at least once before client process 120 requests services of remote server process 150—which, for example, can result from compiling client process 120 and remote server process 150 from the headers containing the data definitions and associated type numbers to generate an agreed-upon type/type-number mapping). Alternatively, an encoding or marshalling function can also encode a type object descriptor for each type associated with the data value or values to be sent, adding those to the beginning of the encoded data stream. In this implementation, the corresponding decoding or unmarshalling function first decodes the encoded type descriptors, and uses these decoded descriptors to reassemble the encoded parameter values in remote server process 150's address space. This enables client process 120 to communicate with remote server process 150 based solely on an agreed upon set of type descriptors, without requiring that both processes actually agree beforehand on type objects for each registered type ID. Data encoded in this format can also be compactly and efficiently archived—for example, by generating a binary file including a header corresponding to the encoded type descriptor. Remote process 150 can later parse the file and reconstruct the stored data.

As described above, system 100 generates type descriptions (type objects) dynamically, at runtime. Accordingly, client process need not encode and send an entire data structure if, for example, a method of remote server process requires only a portion of the data structure. Thus, for a client process 120 that defines a particular C struct having 20 distinct fields, if a service of remote server process 150 requires only the first and fifth fields, client process 120 can create a type object describing only those fields and pass only those fields to remote server process 150, thus requiring commensurately fewer network resources. Similarly, system 100 can provide for a parameterized Struct type (similar to the parameterized array and pointer types discussed above), which contains as one of its fields a bitmask of "valid" attributes. When client process 120 is called on to marshal a structure of this type, it marshals only the fields identified as valid; at the receiving end, remote server process 150 unmarshals the bitmask field first, and then unmarshals only the specified valid fields, setting the remaining fields to default (or zero) values.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. For example, the steps of the methods need not be performed in the precise order disclosed. Accordingly, other embodiments are within the scope of the following claims.

What is claimed is:

1. A computer-implemented data processing method, comprising:
    running a first process in a first address space and a second process in a second address space, the first process including a request to send to the second process data having a data type;
    calling at runtime a type creation function to create a first type object describing the data type, the first type object having a set of associated functions for processing data, the set of associated functions including a marshalling function for encoding data and an unmarshalling function for decoding data;
    executing the marshalling function in the first process to generate encoded data, the marshalling function executed in the first process taking as input the data and the first type object;
    communicating the encoded data to the second process; and
    executing the unmarshalling function on the encoded data to decode the encoded data in the second process.

2. The method of claim 1, wherein the set of associated functions for processing data having the data type includes a print function for printing data having the data type.

3. The method of claim 1, wherein the data type is an array type, an integer type, a pointer type, a real type, a string type or a structure type.

4. The method of claim 1, wherein the first type object is a parameterized type object including an element identifying a location in memory, the parameterized type object describing a format for the data type based on one or more type parameters in the identified location.

5. The method of claim 4, wherein the element identifying a location in memory is an offset element identifying a location in memory relative to the data.

6. The method of claim 5, wherein the parameterized type object describes a dynamically sized array and the type parameters include data specifying a size of the dynamically sized array.

7. The method of claim 5, wherein the parameterized type object describes a dynamically typed pointer and the type parameters include data identifying a second type object.

8. The method of claim 1, wherein:
    the set of associated functions includes a type description function operable to generate a type object description describing the first type object;
    the encoded data includes an encoded representation of the type object description; and
    executing the unmarshalling function to decode the encoded data includes reconstructing the data in the second address space based on the type objet description.

9. The method of claim 1, wherein:
    the first type object has a set of properties including a limitation condition specifying a limitation on permissible values for data having the data type; and
    executing the unmarshalling function to decode the encoded data includes returning an error message if the data violates the limitation condition.

10. The method of claim 1, wherein:
    the type creation function is called in the first process to create a first instance of the first type object and in the second process to create a second process of the first type object.

11. The method of claim 1, wherein:
    the data has a first format in the first process; and
    the encoded data is decoded in the second process to generate data having a second format, the seed format being different than the first format.

12. The method of claim 11, wherein:
    the encoded data is generated in a format that is independent of the first and second formats.

13. The method of claim 1, wherein:
    the marshalling function executing in the fist process sends the encoded data to the second process.

14. A computer-implemented data processing method, comprising:
    running a first process in a first format in a first address space and a second process in a second format in a second address space, the first process including a request to send to the second process data having a data type;
    calling at runtime in the first process a type creation function to create a first instance of a type object describing the data type, the type object having a set of associated functions for processing data, the set of associated functions including a marshalling function for encoding data and an unmarshalling function for decoding data;
    calling at runtime in the second process the type cordon function to create a second instance of the type object describing the data type;
    executing in the first process the marshalling function, taking as inputs the data and the first instance of the type object to generate encoded data in a format independent of the first and second formats;
    communicating the encoded data from the first process to the second process; and
    executing in the second process the unmarshalling function to decode the encoded data.

15. A computer program product, tangibly stored on a computer-readable medium, for processing data, comprising instructions operable to cause a programmable processor to:

run a first process in a first address space and a second process in a second address space, the first process including a request to send to the second process data having a data type;

call at runtime a type creation function to create a first type object describing the data type, the first type object having a set of associated functions for processing data, the set of associated functions including a marshalling fiction for encoding data and an unmarshalling function for decoding data;

execute the marshalling function in the first process to generate encoded data, the marshalling function executed in the first process taking as input the data and the first type object;

communicate the encoded data to the second process; and execute the unmarshalling function on the encoded data to decode the encoded data in the second process.

16. The computer program product of claim 15, wherein the set of associated functions for processing data having the data type includes a print function for printing data having the data type.

17. The computer program product of claim 15, wherein the data type is an array type, in integer type, a pointer type, a real type, a string type or a string type.

18. The computer program product of claim 15, wherein the first type object is a parameterized type object including an element identifying a location in memory, the parameterized type object describing a format for the data type based on one or more type parameters in the identified location.

19. The computer program product of claim 18 wherein the element identifying a location in memory is an offset element identifying a location in memory relative to the data.

20. The computer program product of claim 19 wherein the parameterized type object describes a dynamically sized array and the type parameters include data specifying a size of the dynamically sized array.

21. The computer program product of claim 19, wherein the parameterized type object describes a dynamically typed pointer and the type parameters include data identifying a second type object.

22. The computer program product of claim 15, wherein:

the set of associated functions includes a type description function operable to generate a type object description describing the first type object;

the encoded data includes an encoded representation of the type object description; and the unmarshalling function includes instructions operable to cause the programmable processor to reconstruct the data in the second address space based on the type object description.

23. The computer program product of claim 15, wherein:

the first type object has a set of properties including a limitation condition specifying a limitation on permissible values for data having the data type; and the unmarshalling function includes instructions operable to cause the programmable processor to return an error message if the data violates the limitation condition.

24. The computer program product of claim 15, wherein:

the type creation function is called in the first process to create a first instance of the first type object and in the second process to create a second instance of the first type object.

25. The computer program product of claim 15, wherein:

the data has a first format in the first process; and the encoded data is decoded in the second process to generate data having a second format, the second format being different than the first format.

26. The computer program product of claim 25, wherein:

the encoded data is generated in a format that is independent of the first and second formats.

27. The product of claim 15, wherein:

the marshalling function executed in the first process sends the encoded data to the second process.

28. A computer program product, tangibly stored on a computer-readable medium, for processing data, comprising instructions operable to cause a programmable processor to:

run a first process in a first format in a first address space and a second process in a second format in a second address space, the first process including a request to send to the second process data having a data type;

call at runtime in the first process a type creation function to create a first instance of a type object describing the data type, the type object having a set of associated functions for processing data, the set of associated functions including a marshalling function for encoding data and an unmarshalling function for decoding data;

call at runtime in the second process the type creation function to create a second instance of the type object describing the data type;

execute in the first process the marshalling function, the marshalling function taking as inputs the data and the first instance of the type object, to generate encoded data in a format independent of the first and second formats;

communicate the encoded data from the first process to the second process; and execute in the second process the unmarshalling function to decode the encoded data.

* * * * *

UNITED STATES PATENT AND TRADEMARK OFFICE
CERTIFICATE OF CORRECTION

PATENT NO. : 6,842,786 B1
DATED : January 11, 2005
INVENTOR(S) : Brandyn Webb

It is certified that error appears in the above-identified patent and that said Letters Patent is hereby corrected as shown below:

Column 10,
Line 29, please delete "seed" and insert -- second -- therefor.
Line 35, please delete "fist" and insert -- first -- therefor.
Line 51, please delete "cordon" and insert -- creation -- therefor.
Line 56, please insert a comma after "object".

Column 11,
Line 23, please delete "in" and insert -- an -- therefor.
Line 24, please delete the second "string" and insert -- structure -- therefor.

Signed and Sealed this

Twenty-sixth Day of April, 2005

JON W. DUDAS
*Director of the United States Patent and Trademark Office*